United States Patent Office 3,834,966
Patented Sept. 10, 1974

3,834,966
ADHESIVE BONDING SYSTEM
James E. Kelly, Melrose, Mass., assignor to Mech-El
Industries, Inc., Woburn, Mass.
Filed Dec. 26, 1972, Ser. No. 318,207
Int. Cl. B32b 31/00
U.S. Cl. 156—379                    8 Claims

ABSTRACT OF THE DISCLOSURE

This invention pertains to an adhesive bonding system for bonding miniature objects to a substrate utilizing an adhesive dispenser capable of dispensing minute quantities of adhesive; a vacuum powered tool to pick up and place the objects to be bonded on the adhesive; means to move the adhesive dispenser and the vacuum powered pickup and place tool sequentially into the work area; means to operate the adhesive dispenser and the vacuum powered pickup and place tool independently; an optical system for positive viewing and control of the dispensing of adhesive; and the pickup and placement of the objects to be bonded by an operator. Utilizing one of a series of interchangeable adhesive dispenser cartridges, this system permits the precisely controlled dispensing of minute quantities ranging from .001 inches in diameter and .0005 inches in thickness to .250 inches in diameter to .200 inches in thickness, of various adhesives, solder pastes, epoxies, and the like of varying viscosities at precise locations on a substrate. A novel dispenser cartridge for the smallest size units ranging from .001 inches in diameter and .0005 inches in thickness to .020 inches in diameter and .020 inches in thickness is also disclosed. This adhesive bonding system is used for bonding semiconductors and the other components to substrates or electrical leads in the manufacture of hybrid circuits, but is easily adaptable to other applications.

BACKGROUND OF THE INVENTION

Field of the Invention

The present invention pertains to a novel adhesive bonding system which includes an adhesive dispenser, a vacuum pick-up tool, means to move said dispenser and said tool into and out of the work area sequentially, and an optical system to provide positive operator viewing and control of the operation of said dispenser and said tool.

The adhesive dispenser permits the precisely controlled dispensing of minute quantities of various adhesives, solder pastes, epoxies and the like of varying viscosities at precise locations on a substrate. Utilizing one of a series of interchangeable adhesive dispensing cartridges, the system is capable of dispensing units of adhesives as small as .001 inches in diameter and .0005 inches in thickness, and as large as 0.250 inches in diameter and 0.200 inches in thickness. A novel dispenser for smaller size units, .001 inches to .020 inches in diameter and .005 inches to .020 inches in thickness, is also disclosed.

The vacuum tool picks up small objects and places them on the adhesive so dispensed. Both the adhesive dispenser and the vacuum tool are mounted on a motorized turret which pivots each into the operator viewing area sequentially, thus permitting positive operator viewing and control of each step in adhesive bonding process including the dispensing of the adhesive. The system is utilized primarily in electronic applications for bonding small semiconductors to various substrates or electrical leads, but is readily adaptable to other applications.

Description of the Prior Art

In the manufacture of microminiature electronic circuits it is frequently necessary to bond small circuit dice or chips, usually made on a silicon base, to various substrates, electrical leads, or circuit packages without the utilization of excessive heat which could damage the components. The development of modern adhesives and epoxies has made this possible. However, reliable, precise dispensing systems for adhesives, solder pastes, epoxies and the like of varying viscosities, have not been readily available on the commercial market. In particular, systems capable of dispensing minute quantities as small as .001 inches in diameter and .0005 inches in thickness have not been available at all.

Mech-El Industries, Inc. and other companies have developed special purpose systems for bonding microminiature electronic circuits or semiconductors onto substrates or circuit packages. Since these circuits are frequently made on small pieces of silicon or a similar substance, the small pieces are referred to as dice or chips and the adhesive bonders are referred to as die bonders. These systems have included a tool for picking up and placing down a small circuit chip and an adhesive dispenser which allows reasonably precise dispensing of small units of epoxy on a substrate, both operations taking place simultaneously. In these machines the operation of dispensing the adhesive was out of the viewing area of the operator.

These early machines have several major problems. None of the early machines was able to dispense small units or dots of adhesive of uniform diameter and thickness on a consistent basis. This difficulty was particularly acute for the smaller sized units of adhesive. The system of the present invention provides a two-fold solution to this problem. It provides a means to move the adhesive dispensing operation within the operator work area to provide positive viewing and control over this operation. It also provides a novel adhesive dispensing cartridge capable of dispensing minute quantities of adhesive with positive control of the diameter and thickness of the unit of adhesive dispensed. The early machines encountered difficulty in dispensing small units of adhesives having a wide range of viscosities, particularly with those adhesives having a high viscosity. The novel small dot dispenser of the present invention provides a solution to this problem also.

As mentioned earlier, the design of the early machines was such that the operator could not view the actual dispensing of the adhesive and therefore could not correct or compensate for mechanical inaccuracies. The early machines dispensed the adhesive on a substrate simultaneously with the pickup of a semiconductor die from a container. Only the die pickup operation was within the view of the operator. These machines then moved the substrate under the pickup tool and placed the die on the small unit of adhesive. However, when very small and precisely located units of adhesive, epoxy or the like are required, or when multiple units in close proximity are required, minute changes in the dispensing action can cause serious errors of position or quantity. Some degree of precision in the control of the dispensing action has been obtained by regulating the force pressure, the time of applied pressure, the height of the dispensing orifice above the work piece and by other means of mechanical control.

None of the special systems heretofore devised have proved satisfactory for the reasons stated earlier. The system of the present invention has been designed to compensate for the lack of precision in locating the area on which the unit of adhesive should be dispensed, the lack of uniformity in the size of units dispensed, and the lack of operator control by placing all steps of the process under view and control of the operator. It also provides for the dispending of smaller units of uniform diameter and thickness than heretofore possible on a consistent basis by a novel design of a small dot dispenser.

Since the present system can dispense a wide range of adhesives in a wide range of dot sizes and can accommodate any pickup and place tool, the system may be easily adjusted for any adhesive bonding application within its scope of operations.

SUMMARY OF THE INVENTION

The present invention pertains to an adhesive bonding system for bonding miniature objects to a substrate. The system includes a series of interchangeable adhesive dispenser cartridges capable of dispensing precisely controlled minute quantities of adhesives of varying types and viscosities. It also includes a vacuum powered tool to pick up and place the objects to be bonded on the adhesive. It also provides a means to move the adhesive dispenser and the vacuum powered pickup and place tool sequentially into the work area and means to operate each independently of the other. It further provides an optical system for positive viewing and control of the dispensing of adhesives and the pickup and placement of the objects to be bonded by an operator.

The adhesive dispenser cartridge permits the precisely controlled dispensing of minute quantities of various adhesives, solder pastes, expoxies and the like of varying viscosities at precise locations on a substrate. The system can utilize any one of a series of interchangeable adhesive dispensing cartridges which together provide the system with the capability of dispensing units of adhesives as small as .001 inches in diameter and .0005 inches in thickness, and as large as 0.250 inches in diameter and 0.200 inches in thickness. A novel dispenser for smaller size units, .001 inches in diameter to .020 inches in diameter and .0005 inches to .020 inches in thickness, is also disclosed. This dispenser has a conical shaped tip through which a small wire protrudes. The adhesive is stored in the cone and the wire is normally in a down position. To place adhesive on the wire, the wire is retracted into the cone, and some adhesive adheres to its outer surface. The wire is then lowered and comes out coated with adhesive. The tip of the wire is touched to the substrate to deposit a small dot adhesive on the substrate. The size and quantity of the units dispensed and compensation for varying viscosities can be made through variations in the diameter of the wire and the diameter of the opening at the apex of the cone. Within this small dot dispenser, the diameter and thickness of the units of adhesive dispensed may be varied by utilizing matched sets of dispenser cones and wires of varying diameters.

Larger sized units of adhesive are dispensed by dispenser cartridges having conventionally designed dispensing needles through which the adhesive is dispensed under varying conditions of time and pressure for units of varying sizes and quantities. All the dispensing cartridges are designed to fit into a common cartridge holder and to be controlled by a single controller. Individual cartridges can be rapidly inserted in or removed from the cartridge holder.

The adhesive bonding system of the present invention includes a work area at its center which the operator can view through a microscope mounted on its housing and which is illuminated by a high intensity lamp also mounted on the housing. A container stand is mounted at one end of said platform and a work surface for substrates is mounted on the other side. By sliding the platform in either direction, the container stand or the work surface can be centered in the operator viewing area.

This adhesive bonding system also includes a vacuum-powered pickup and place tool having a tip to receive the small objects which it picks up from a container on the container stand and places on a unit of adhesive dispensed on the substrate. Both the vacuum pickup and place tool and the adhesive dispenser cartridge are mounted parallel arms which extend rearward and are pivotally mounted towards either end of a pivot bar in the rear of the housing.

This pivot bar is itself mounted on a horizontally pivoting motorized turret. By pivoting the turret horizontally through a small arc, either the pick-up and place tool or the adhesive dispenser cartridge can be moved within the operator viewing area sequentially, and by use of a micro-manipulator, either the container stand or the work surface on which the substrate is located can be precisely positioned under the tool or the dispenser. Means are provided to insure that one of these arms is held out of the way at all times. Logic interlocks insure that the adhesive dispenser cartridge or vacuum pickup and place tool fires only when it is in proper position in the operator viewing area under the microscope and over the working surface. Provision is made for the adhesive dispenser or vacuum pickup tool to fire independently to allow the dispensing of multiple units of adhesive or placement of multiple objects on units of adhesive one at a time. The operator also has the option of placing several small dots on which a single object will be placed instead of one large one.

The adhesive bonding system of the present invention with its capability of moving all relevant work surfaces tools and dispensers within the operator viewing area provides the operator with positive viewing and control of each step in the adhesive bonding sequence. The system of the present invention allows the operator to have a positive view of the actual dispensing of small units of the adhesive through a microscope. This ability to view the actual dispensing of the adhesive permits an operator to exert a precise degree of control over the entire process and compensate for any mechanical deviations from the desired process. For instance, if a small dot is dispensed and a larger one is required, one or several additional dots may be dispensed by the operator until the required amount is dispensed. Precise location of the dispensed dots may be obtained through the operator's use of a micro-manipulator or other positioning system while viewing the workpiece through a microscope, but always within full viewing control by the operator. This full viewing ability permits the operator to take immediate corrective action if required. After one or more dots are dispensed, the operator can move the pickup and place tool into view while moving the dispenser away from the work piece. Semiconductor chips or other small objects can then be picked up and precisely placed onto the dots of adhesive.

This system is especially suited for use during semiconductor chip placement on hybrid circuit substrates, epoxy attachment of leads to substrates using beam leaded devices, attachment of flip chips using epoxy or solder paste, and the attachment of light-emitting diodes, microwave devices and other small precision objects. It is also capable of performing a wider range of dispensing functions both as to size and quantity of units of adhesive dispensed and types of adhesives dispensed than has hitherto been possible. It also is capable of performing these operations consistently, obtaining a uniformity of size of units of adhesive dispensed not hitherto possible in prior systems.

A more complete and detailed understanding of this invention may be obtained by carefully studying the following detailed description in combination with the accompanying drawings.

DESCRIPTION OF THE PREFERRED EMBODIMENT

Figure 1:
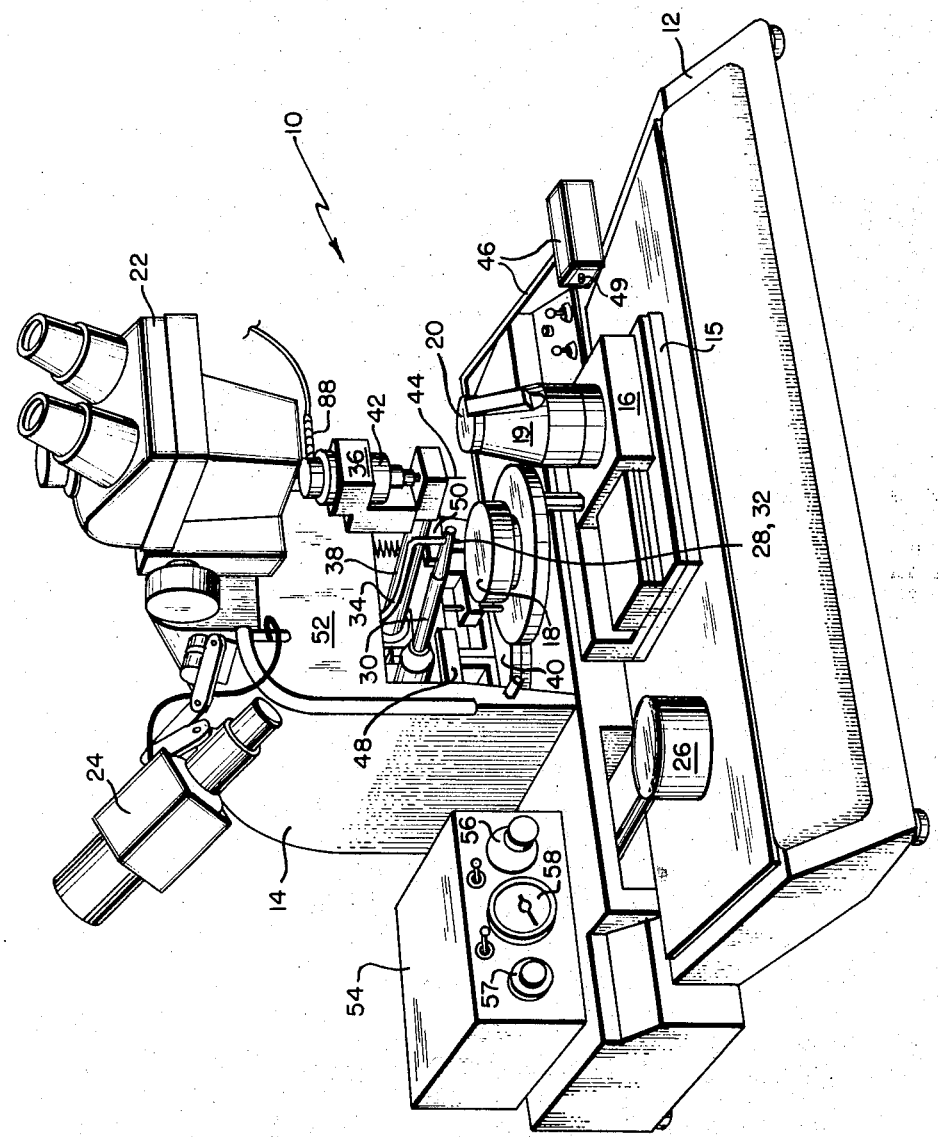
FIG. 1 is a front perspective view of the adhesive bonding system of the present invention.
Figure 3:
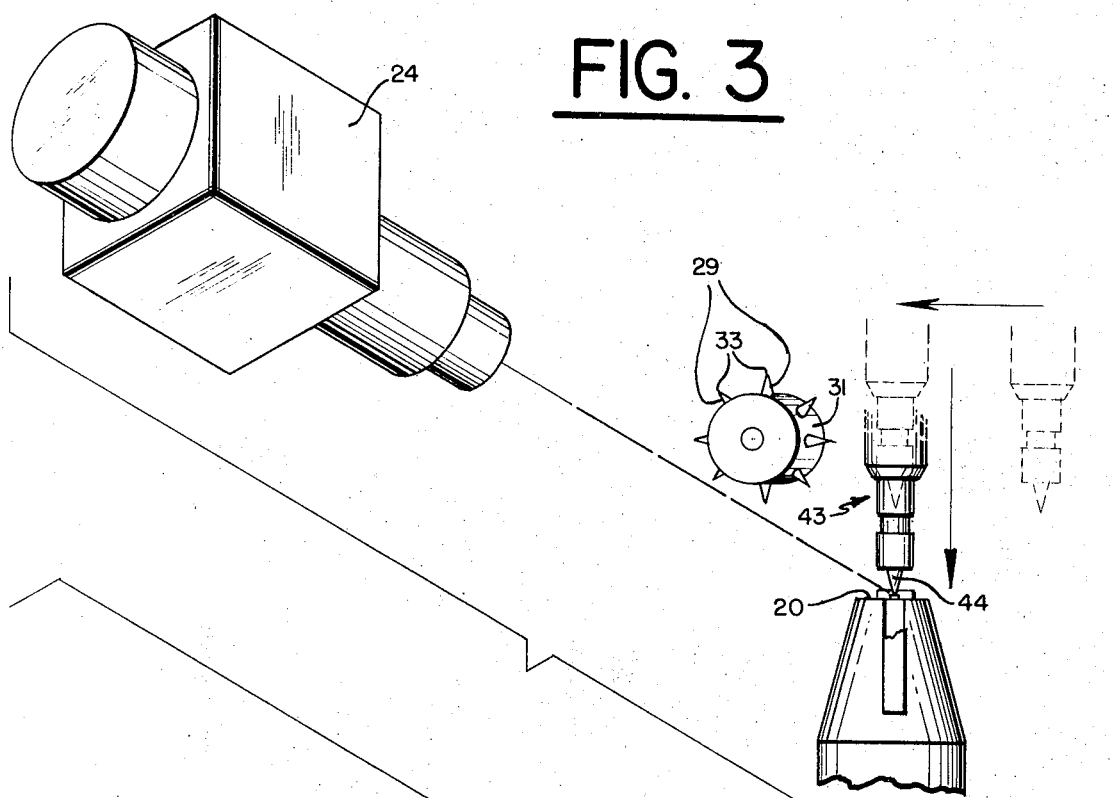
FIG. 3 is a partial schematic view of the illumination of the operator work area of the present invention with the adhesive dispenser cartridge in dispensing position on a substrate on the work station.
Figure 4:
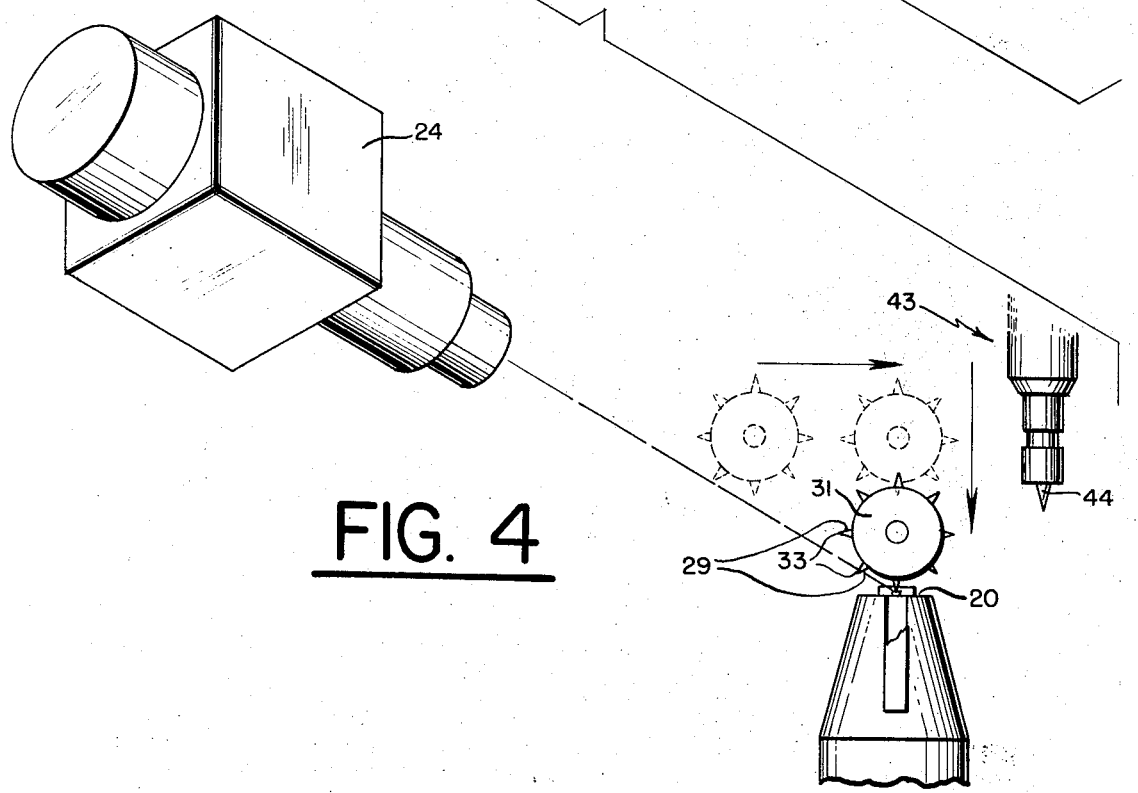
FIG. 4 is a partial schematic view of the illumination of the operator work area of the present invention with a pick-up and place tool in position to place a die on the substrate on the work station.

Referring now to the drawings, and in particular to FIG. 1, the reference numeral 10 indicates generally the adhesive bonding system of the present invention. Adhesive bonding system 10 is mounted in a housing having a lower housing unit 12 and an upper housing unit 14. A movable platform 15 is mounted in the middle of the forward portion of lower housing platform 12 capable of movement along X and Y axes. A horizontally sliding platform 16 mounted on movable platform 15 serves as a base for container stand 18 for placement of a container of objects to be bonded and for work surface stand 19, the top of which serves as the work surface 20 adapted to receive a substrate or other device to which said objects are to be adhesively bonded. Sliding platform 16 is positioned such that either the container stand 18 or work surface 20 can be positioned in the center of lower housing unit 12, and may be locked in either position for accurate alignment by any conventional locking means. A microscope 22 is adjustably attached to upper housing unit 14 for operator viewing of the work surface 20 or container stand 18 when either is centered. A high intensity lamp 24 is also mounted on said upper housing unit 14 to illuminate the operator viewing area under microscope 22, as illustrated in FIGS. 3 and 4. A micro-manipulator 26 permits a one inch "x" and "y" movement of platform 15 with a 6:1 ratio for precision in positioning or indexing objects on container stand 18 or dispensing locations on a substrate on work surface 20. The full range of movement under the control of micro-manipulator 26 is within the operator viewing area under microscope 22 and lamp 24. An optional gross motion attachment (not shown) may be added to increase the movement of platform 15 along the "x" and "y" axes.

A pickup and place tool 28, frequently referred to in semiconductor applications as a die collet, is vertically mounted on the forward end of tool arm 30. Pickup and place tool 28 has a Teflon coated tip adapted to receive and hold the objects to be picked up and placed down. The use of a Teflon-coated, vacuum powered pickup and place tool prevents edge damage to the objects being picked up and assists in the proper alignment of the objects on a substrate on work surface 20.

Figure 2:
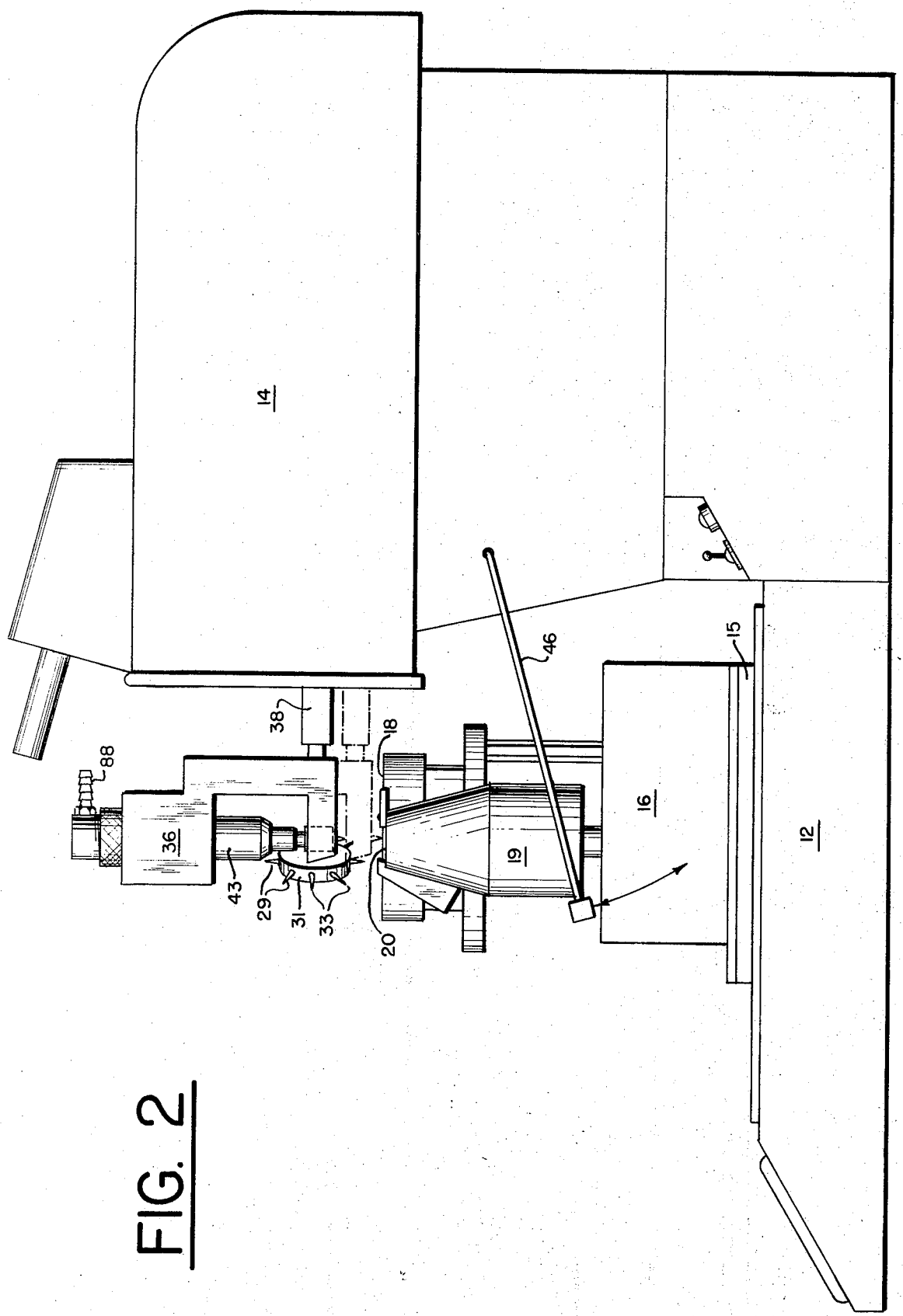
FIG. 2 is a side perspective view of the adhesive bonding system of the present invention, with the adhesive dispenser cartridge in operative position over a substrate.

The interior of tool 28 is hollow and is connected at its top to a vacuum system by hose 34 to enable tool 28 to pickup and retain an object to be bonded. In place of the single tip pickup and place tool illustrated in FIG. 1, a rotary tool arm 31 may be installed containing a plurality of pickup and place tools 29, each having tips 33 of varying sizes to pickup and hold objects of varying sizes, as illustrated in FIG. 2. Tool arm 30 extends horizontally rearward and is pivotally mounted on a pivot bar (not shown) toward the rear of upper housing unit 14 such that pickup and place tool can pivot vertically upward or downward from the container stand 18 or work surface 20. Tool arm 30 is also mounted toward one side of the center point of said pivot bar.

An adhesive dispenser cartridge mount 36 capable of receiving each of the interchangeable adhesive dispenser cartridges of the system is mounted to the forward end of cartridge mount arm 38. Cartridge mount arm 38 extends horizontally rearward and parallel to tool arm 30 and is pivotally mounted to the same pivot bar the same distance from the center of said pivot bar as tool arm 30 except on the other side of the center point. Pivot bar is mounted on a motorized, horizontally pivoting circular turret plate 46 mounted in the base of upper housing unit 14. Turret plate 40 pivots through a small arc such that at one extreme of its arc, pickup and place tool 28 is precisely centered over work surface 20 or container stand 18, whichever happens to be centered in the operator viewing area. At the other extreme of the arc of turret plate 40, the tip of adhesive dispenser cartridge 42 mounted in cartridge mount 36 will be centered over the substrate on work surface 20 and within full view of the operator. An alternative to the motorized turret plate 40 would be a sliding platform similar to platform 16 on which the pivot bar of tool arm 30 and cartridge mount arm 38 would be mounted. In this alternative, centering of the desired unit within the operator work and viewing area would be accomplished by sliding the platform. Essential to the present system is the capability to move the pickup and place tool 28 and the adhesive dispenser cartridge 42 into and out of the center of the operator viewing and work area. Both of the means described above will accomplish this.

Pickup and place tool 28 and adhesive dispenser cartridge 42 are mounted such that their tips 30, 44 are approximately equidistant above the work surface 20 and are lowered to container stand 18 or work surface 20 under the control of Z-lever 46 which is connected to the pivot bar to which tool arm 30 and cartridge mount arm 38 are mounted, as illustrated in FIGS. 2, 3, and 4.

Since both tool arm 30 and cartridge holder arm 38 are mounted on the same pivot bar 38 whose pivoting action is controlled by Z-lever 46, horizontal stops 48, 50, integrally formed with face plate 52 of upper housing unit 14 are provided to prevent the depression and activation of one arm when the other is lowered by Z-lever 46. Bar 48 prevents tool arm 30 from moving downward when cartridge holder arm 38 is within the operator viewing area. Bar 50 prevents cartridge holder arm 38 from moving downward when tool arm 30 is within the operator viewing area.

As mentioned earlier, a series of interchangeable adhesive dispenser cartridges can be mounted in cartridge mount 36. The adhesive dispenser cartridge 42 illustrated in FIG. 1 is a small dot dispenser. A large dot dispenser 43 is illustrated in FIGS. 2 and 3. The dispensing of adhesives from adhessive dispenser cartridge may be controlled by any conventional actuating mechanism such as pneumatic, mechanical, electrical or electro-mechanical. In the present embodiment, a pneumatic mechanism is utilized for both large dot dispensers and small dot dispensers. A universal controller 54, mounted on lower housing unit 12 is utilized to control the time and pressure of the dispensing operation. It has a timer 56, a pressure regulator 57 and a pressure gauge 59 for this purpose, the operation of which will be explained later.

In operation, the adhesive bonding system 10 of the present invention is primarily utilized for the bonding of microminiature electrical circuits manufactured on small chips or dice of silicon or a similar substance to a substrate or circuit package. It should be clearly understood, however, that other applications for adhesive bonding of small objects to various surfaces are also feasible with this machine and within the scope of this invention. The operator places a container of the circuit dice on container stand 18; the substrate to which the dice are to be bonded on work surface 20, and an adhesive dispenser cartridge 42 in cartridge mount 36. The operator then slides platform 15 to the left or right as required and through the use of micro-manipulator 24, locates a circuit die on container stand 18 within the viewing area of microscope 22 illuminated by lamp 24. The operator also pivots pickup and place tool 28 to the center of the viewing area by use of a foot pedal (not shown) which activates the drive mechanism of turret plate 40. The operator then partially lowers the tip 32 of pickup and place tool 28 towards the die by partially depressing Z-lever 46, while moving container stand 18 with micro-manipulator 24 until the tip 32 of pickup and place tool 28 is over the die to be picked up. The operator then picks up the die by lowering tool 28 and activating the vacuum by further downward motion of Z-lever 46 and pressing a button 49 on the side of Z-lever 46 to activate the vacuum mechanism. The operator then raises Z-lever 46 fully to raise tool 28 from container stand 18 and back to its normal position, with the die held in tip 32.

After having picked up a die with pickup and place tool 28, the operator slides platform 16 to the reverse side and pivots the pickup and place tool 28 out of the viewing area and the adhesive dispenser cartridge into the viewing area by activating the motorized turret plate 40. By the use of micro-manipulator 26 and partially depressing Z-lever 46 to lower the tip 44 of dispenser cartridge 42, the operator locates the bonding point on the surface of the substrate on work surface 20 directly under the tip 44 of adhesive dispenser 42. Having precisely located this point, the operator depresses Z-lever 46 further and dispenses the required unit of adhesive. The operator then raises Z-lever 46 and inspects the drop of adhesive for precision of quantity and location. If additional drops are required, the operator can dispense them by raising and lowering the dispenser cartridge 40 through the use of Z-lever 46. After the adhesive dispensing operation is completed, the operator then pivots the adhesive dispenser cartridge 36 out of the viewing area, and pickup and place tool 28 into the viewing area by activating the drive mechanism of turret plate 40. Since work surface 20 is already in position, tool 28 should be directly over the dot of adhesive just dispensed. If work surface 20 has moved slightly, the precise location for placement of the die can easily be found. The operator then depresses Z-lever 46 to release the vacuum and deposit the die on the adhesive dot. The operation is then complete and the operator can move to the next bonding sequence.

The sequence of operations in the bonding process may be varied because the pickup and place tool 28 and the adhesive cartridge dispenser each operate independently through logic interlocks which permit only the centered unit to operate.

If desired, the operator can alter the sequence by first placing all the required dots of adhesive on the substrate on work surface 20 and then pickup and place the dice sequentially on the dots. For some applications, it is preferable to place multiple dots on the substrate for bonding a single die or chip.

Figure 5:
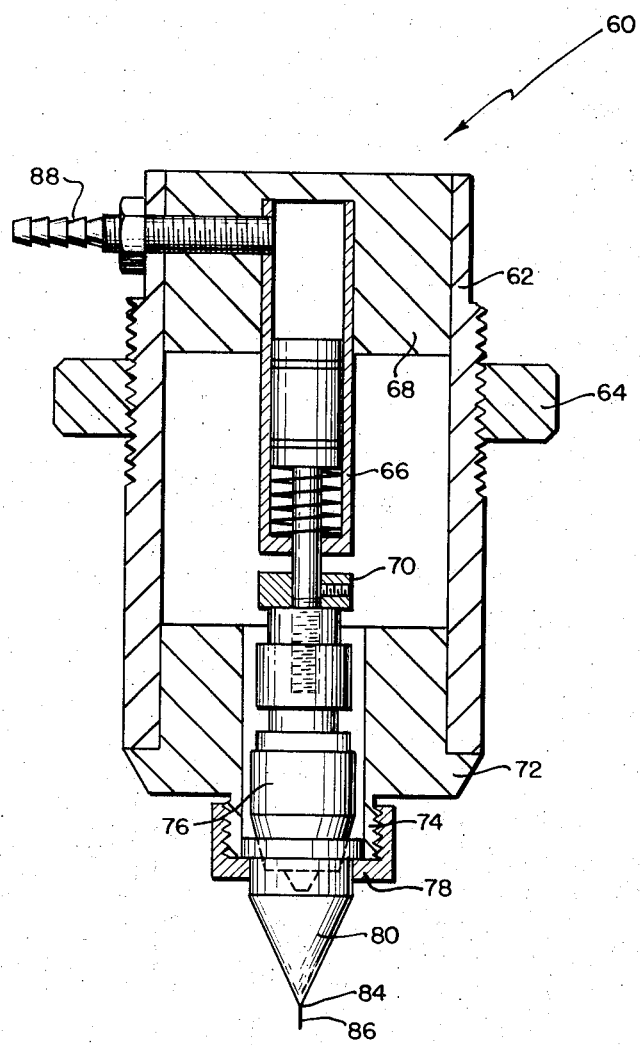
FIG. 5 is a partially cut-away view of the small dot adhesive dispensing cartridge of the present invention.

Adhesive bonding system 10 can use a variety of adhesive dispenser cartridges 36, depending on the size of the unit of adhesive required. For smaller sized dots ranging from .001 inches in diameter and .0005 inches in thickness to .015 inches in diameter and .010 inches in thickness, adhesive dispensing system 10 uses a novel small dot dispenser cartridge denoted by reference numeral 60 in FIG. 5. Small dot dispenser 60 comprises a dispenser housing 62 which is a cylindrical tube. The upper portion of the exterior of dispenser housing 62 is threaded to receive an adjustment nut 64 for adjusting the height of dispenser 60 in cartridge holder 36. Within said housing 62 is located an actuating means for activating the dispenser 60. A variety of actuating means may be utilized for this purpose, such as pneumatic, mechanical, electromechanical or electrical means. The embodiment decribed in this specification and illustrated in the accompanying drawings utilizes a pneumatic actuating means. The means illustrated in FIG. 5 comprise a subminiature air cylinder 66 with a spring return. Air cylinder 66 is mounted within housing 62 and held in position by air cylinder sleeve 68 at its top and air cylinder collar 70 at its spring end. The lower end of housing 62 is closed by cartridge base 72, which includes a cylindrical threaded extension 74 at its base. Slidably mounted within base 72 is a pin vise 76 extending vertically from the bottom to the top of base 70. Also fitted within said base 72 is cone holder 78. A plunger cone 80 is mounted with its top—the top of plunger cone 80 is inserted within base 72 such that it surrounds the lower end of pin vise 76, extends vertically below base 72 and is held in position by dispenser couple 82 which is screwed on to the bottom of base 72. Plunger cone 80 is conical in shape and has a small aperture 84 to receive a wire 86, the top end of which is inserted into pin vise 76 and which extends vertically downward through aperture 84. Pin vise 76 slides up and down as controlled by air cylinder 66. An air hose fitting 88 is mounted near the top of dispenser housing 62 to receive an air hose to supply pressure to air cylinder 66. In practice, wire 86 may be a carbon steel drill bit for dispensing units of .005 inches in diameter or larger. For units as small as .001 inches in diameter, a fine wire is used which may or may not have a fluted perimeter.

A frequent use of extremely small dots of about .001 inches in diameter and .0005 inches in thickness is the bonding of fine lead wire of about .001 inches in diameter to semiconductors and similar components.

In order to achieve a range of precise dot sizes with dispenser 60, the diameter of wire 86 and the diameter of operative 84 in plunger cone 80 may be varied by the use of interchangeable matched pairs of plunger cones and wires or drill bits. Usually the diameter of aperture 84 will be about .002 to .003 inches larger than the diameter of wire 86. Three standard matched pairs have wire 86 diameters of .005, .010 and .015 inches respectively, since carbon steel drill bits are available in these sizes. Depending on the viscosity of the adhesive, these drill bits may be inserted into pin vise 76 such that either the smooth shaft or the fluted end of the drill bit extends vertically downward.

In operation, this small dot dispenser 60 is loaded with an adhesive, solder paste, epoxy or similar substance in its plunger cone 80. A wire or carbon steel drill bit 86 is inserted in pin vise 76 and tightened therein. In its initial position, with air pressure supplied to air cylinder 66, pin vise 76 is downward such that wire 86 extends through the apex aperture 84 of plunger cone 80. When the air pressure is released, air cylinder 66 under pressure of its spring return, returns to a normal position; pin vise 76 moves upward, and wire 86 is retracted within plunger cone 80. While wire 86 is retracted within plunger cone 80, minute quantities of adhesive adhere to its outer surfaces. Depending on the size of the dot required, the viscosity of the adhesive and the surface perimeter of wire 86, the length of time wire 86 is retracted can be varied to insure that the proper quantity of adhesive is picked up by wire 86. Pressure is then reapplied to force wire 86 downward for dispensing the next dot.

To dispense the adhesive, Z-lever 46 is fully depressed to cause wire 86 to touch the substrate on work surface 20. As Z-lever 46 is returned to its normal position it activates a micro-switch (not shown) to retract wire 86 within plunger cone 80 to pick up adhesive for the next operation. The timing of the retraction is set on timer 56 on controller 54.

In the embodiment just described pneumatic pressure is applied to keep wire 86 in its downward dispensing position and released to put it into an upward loading position. An alternate embodiment (not shown) applies pressure to force wire 86 upward into its loading position and releases pressure to let wire 86 return downward into its dispensing position. Since the application and release of pressure is inverse, the same universal controller 54 may be used for either embodiment.

As mentioned earlier, larger sized units or dots of adhesive, above .020 inches in diameter and .020 inches in thickness are obtained by use of a large dot dispenser 43 placed in cartridge mount 36. Large dot dispenser 43 is a conventional needle-type dispenser mounted in a housing similar to housing 62 of small dot dispenser. Large dot dispenser 43 can also be actuated by any conventional actuating means, preferably the same means used for small dot dispenser 60 in any one system. In the embodiment illustrated in FIG. 1, pneumatic pressure is utilized to force adhesive through the needle of large dot dispenser 43. The time and pressure are controlled by universal controller 54.

The adhesive bonding system of the present invention provides an extremely versatile system for bonding small objects to a substrate. It has a unique dispenser for extremely small units of adhesive. It provides an operator with positive viewing and control over the dispensing of the adhesive. It has a variety of applications both within electronics and in other areas of manufacture. While only a single embodiment of this invention has been specifically disclosed in the foregoing specification, it will be obvious to those skilled in the art that many modifications of the disclosed embodiment are possible which will result in the desired object of this invention; namely, the positive viewing of and control over dispensing of minute quantities of various adhesives. Accordingly, all such modifications are intended to be included within the scope of this invention.

I claim:

1. An adhesive bonding system for bonding very small objects at precise locations on a substrate with minute quantities of adhesives under positive viewing and control of an operator comprising:
    a housing;
    a work surface movably mounted on said housing for positioning of the substrate onto which said objects are to be bonded;
    an adhesive dispenser cartridge capable of dispensing minute quantities of adhesives of various types movably mounted on said housing;
    means to move said adhesive dispenser cartridge over said work surface to dispense a unit of adhesive and move it away after dispensing the adhesive;
    means to locate a precise point on said work surface under said adhesive dispenser cartridge;
    means to activate said adhesive dispenser to cause it to dispense a minute quantity of adhesive;
    means for viewing said work surface and said adhesive dispenser cartridge so that the precise location for the adhesive to be dispensed can be located under said dispenser by an operator and the dispensing of the adhesive can be viewed by an operator.

2. The adhesive bonding system as defined in Claim 1 wherein said means for moving said adhesive dispenser cartridge over said work surface comprises:
    a plate movably mounted on said housing;
    a cartridge arm movably mounted on said plate;
    an adhesive dispenser cartridge mount mounted on said arm to hold said adhesive dispenser cartridge;
    means to move said plate such that said adhesive dispenser cartridge will be positioned over said work surface at one point in said movement and not over said work surface at another point in said movement.

3. The adhesive bonding system as defined in Claim 1, wherein said means to locate a precise point on said work surface comprises:
    a platform movably mounted on said housing capable of limited motion on its "x" and "y" axes;
    a work surface mounted on said platform;
    a micro-manipulator to control the movement of said platform.

4. The adhesive bonding system as defined in Claim 1, wherein said adhesive dispenser cartridge further comprises:
    a dispenser housing adapted to be fitted into said cartridge mount on said cartridge housing;
    a conical shaped plunger cone having a small aperture at its apex mounted at the base of said housing and adapted to receive various types of adhesives;
    a fine wire slidably mounted within said housing and extending vertically downward through the aperture in said plunger cone;
    actuating means to retract said fine wire within said plunger cone to pick up adhesive and force it downward through the aperture of said plunger cone to dispense said adhesive;
    means to supply force to said actuating means.

5. The adhesive bonding system as defined in Claim 1 further comprising:
    a tool for picking up, retaining and placing down small objects to be bonded;
    a container stand movably mounted on said housing to hold a container of small objects to be bonded;
    means to move said container stand within the operator viewing area for picking up an object and moving it away thereafter;
    a tool arm mounted in said housing to hold said tool and permit the lowering and raising of said tool to and from said container stand for picking up objects and lowering and raising said tool to and from said work surface;
    movable mounting means for said tool arm to permit moving said tool over said work area to pick up said objects from said container when centered in said work area, and over said work surface to place down said objects on said adhesive on said work surface when centered in said work area, all within the viewing area of an operator.

6. The adhesive bonding system as defined in Claim 1 wherein said system further comprises:
    a source of illumination to illuminate said operator viewing area.

7. The adhesive bonding system as defined in Claim 5 wherein said means to move said tool arm is the same means used to move said adhesive dispenser arm.

8. The adhesive bonding system as defined in Claim 5 wherein said means to move said container stand is the same as the means to move said work surface.

References Cited

UNITED STATES PATENTS

| | | | |
|---|---|---|---|
| 3,715,258 | 2/1973 | Cunnane | 156—356 |
| 3,698,985 | 10/1972 | Robinson | 156—379 |
| 3,636,920 | 1/1972 | Bowman | 118—243 |
| 3,536,039 | 10/1970 | Gardiner | 118—243 |

DANIEL J. FRITSCH, Primary Examiner

N. KALISHMAN, Assistant Examiner

U.S. Cl. X.R.

118—243; 156—64, 297, 299, 560, 569, 578